(12) United States Patent
Park (10) Patent No.: US 9,829,621 B2
(45) Date of Patent: Nov. 28, 2017

(54) OPTICAL MEMBER AND DISPLAY DEVICE HAVING THE SAME

(75) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/234,117

(22) PCT Filed: Jul. 9, 2012

(86) PCT No.: PCT/KR2012/005418
§ 371 (c)(1),
(2), (4) Date: Jan. 21, 2014

(87) PCT Pub. No.: WO2013/012193
PCT Pub. Date: Jan. 24, 2013

(65) Prior Publication Data
US 2014/0160789 A1 Jun. 12, 2014

(30) Foreign Application Priority Data

Jul. 20, 2011 (KR) .................. 10-2011-0071802

(51) Int. Cl.
*F21V 7/04* (2006.01)
*F21V 8/00* (2006.01)
(Continued)

(52) U.S. Cl.
CPC .............. *G02B 6/0026* (2013.01); *F21V 9/16* (2013.01); *G02B 6/0023* (2013.01); *G02B 6/009* (2013.01);
(Continued)

(58) Field of Classification Search
CPC .. G02B 6/0026; G02B 6/0023; G02B 6/0083; G02B 6/009; F21V 9/16; G02F 2001/133614
(Continued)

(56) References Cited

U.S. PATENT DOCUMENTS 5,998,925 A 12/1999 Shimizu et al.
7,004,610 B2 2/2006 Yamashita et al.
(Continued)

FOREIGN PATENT DOCUMENTS

CN 1758114 A 4/2006
CN 1869788 A 11/2006
(Continued)

OTHER PUBLICATIONS

International Search Report in International Application No. PCT/KR2012/005418, filed Jul. 9, 2012.
(Continued)

*Primary Examiner* — Ali Alavi
(74) *Attorney, Agent, or Firm* — Saliwanchik, Lloyd & Eisenschenk (57) ABSTRACT

Disclosed are an optical member and a display device. The display device includes a light guide plate; a light source on a lateral side of the light guide plate; and a wavelength conversion member between the light source and the light guide plate. The wavelength conversion member includes a receiving part between the light source and the light guide plate; a host in the receiving part; and a plurality of wavelength conversion particles in the host. The receiving part includes a convex part between the light source and the host; and a concave part between the light guide plate and the host.

29 Claims, 7 Drawing Sheets

(51) Int. Cl.
*F21V 9/16* (2006.01)
*G02F 1/1335* (2006.01)

(52) U.S. Cl.
CPC .................. *G02B 6/0083* (2013.01); *G02F 2001/133614* (2013.01)

(58) Field of Classification Search
USPC ................................................ 362/608, 317
See application file for complete search history.

(56) References Cited

U.S. PATENT DOCUMENTS

| | | | |
|---|---|---|---|
| 7,481,562 B2 | 1/2009 | Chua et al. | |
| 7,795,055 B2 | 9/2010 | Lee et al. | |
| 8,038,822 B2 | 10/2011 | Kindler et al. | |
| 8,545,083 B2 | 10/2013 | Terajima et al. | |
| 9,110,200 B2 | 8/2015 | Nichol et al. | |
| 9,110,203 B2* | 8/2015 | Seo | G02B 6/0023 |
| 9,244,209 B2 | 1/2016 | Lee et al. | |
| 9,304,355 B2 | 4/2016 | Lee | |
| 9,335,459 B2 | 5/2016 | Kang | |
| 9,551,822 B2* | 1/2017 | Lee | G02B 6/0026 |
| 9,575,234 B2* | 2/2017 | An | G02B 6/0023 |
| 2001/0001207 A1 | 5/2001 | Shimizu et al. | |
| 2002/0001055 A1 | 1/2002 | Kimura et al. | |
| 2002/0071071 A1 | 6/2002 | Sekiguchi et al. | |
| 2003/0165781 A1 | 9/2003 | Takeda | |
| 2004/0190279 A1 | 9/2004 | Kitamura | |
| 2005/0001225 A1 | 1/2005 | Yoshimura et al. | |
| 2005/0221519 A1 | 10/2005 | Leung et al. | |
| 2006/0002101 A1 | 1/2006 | Wheatley et al. | |
| 2006/0034084 A1* | 2/2006 | Matsuura et al. | 362/293 |
| 2006/0034579 A1 | 2/2006 | Sugiura | |
| 2006/0072315 A1* | 4/2006 | Han et al. | 362/231 |
| 2006/0092666 A1 | 5/2006 | Jeong et al. | |
| 2006/0227532 A1 | 10/2006 | Ko et al. | |
| 2006/0227570 A1 | 10/2006 | Rutherford et al. | |
| 2006/0268537 A1* | 11/2006 | Kurihara et al. | 362/34 |
| 2006/0268579 A1 | 11/2006 | Han et al. | |
| 2007/0004195 A1 | 1/2007 | Park et al. | |
| 2007/0012940 A1 | 1/2007 | Suh et al. | |
| 2007/0176196 A1 | 8/2007 | Kim et al. | |
| 2007/0210326 A1 | 9/2007 | Kurihara | |
| 2007/0221865 A1 | 9/2007 | Sohn et al. | |
| 2007/0221866 A1 | 9/2007 | Sohn et al. | |
| 2007/0221943 A1 | 9/2007 | Moriya et al. | |
| 2007/0228390 A1* | 10/2007 | Hattori et al. | 257/79 |
| 2007/0229736 A1 | 10/2007 | Wang et al. | |
| 2007/0263408 A1* | 11/2007 | Chua | G02F 1/133603 362/612 |
| 2008/0037272 A1 | 2/2008 | Song et al. | |
| 2008/0112186 A1 | 5/2008 | Jung et al. | |
| 2008/0284316 A1 | 11/2008 | Kurihara et al. | |
| 2009/0014688 A1 | 1/2009 | Hoshino et al. | |
| 2009/0021148 A1 | 1/2009 | Hachiya et al. | |
| 2009/0034292 A1 | 2/2009 | Pokrovskiy et al. | |
| 2009/0147497 A1 | 6/2009 | Nada | |
| 2009/0152567 A1 | 6/2009 | Comerford et al. | |
| 2009/0173957 A1 | 7/2009 | Brunner et al. | |
| 2009/0231847 A1 | 9/2009 | Pan et al. | |
| 2010/0079901 A1 | 4/2010 | Fukushima | |
| 2010/0110728 A1 | 5/2010 | Dubrow et al. | |
| 2010/0155749 A1 | 6/2010 | Chen et al. | |
| 2010/0164364 A1 | 7/2010 | Eida et al. | |
| 2010/0187975 A1 | 7/2010 | Tsukahara et al. | |
| 2010/0232133 A1* | 9/2010 | Tran et al. | 362/84 |
| 2010/0232134 A1 | 9/2010 | Tran | |
| 2010/0283072 A1 | 11/2010 | Kazlas et al. | |
| 2010/0302493 A1 | 12/2010 | Yang et al. | |
| 2010/0315320 A1* | 12/2010 | Yoshida | 345/83 |
| 2011/0002140 A1 | 1/2011 | Tsukahara et al. | |
| 2011/0031516 A1 | 2/2011 | Basin et al. | |
| 2011/0037926 A1 | 2/2011 | Tsukahara et al. | |
| 2011/0090696 A1 | 4/2011 | Nagai et al. | |
| 2011/0141769 A1* | 6/2011 | Lee | G02B 6/0023 362/629 |
| 2011/0156575 A1 | 6/2011 | Yu et al. | |
| 2011/0176328 A1 | 7/2011 | Anandan et al. | |
| 2011/0249424 A1 | 10/2011 | Joo et al. | |
| 2011/0261303 A1 | 10/2011 | Jang et al. | |
| 2011/0299011 A1 | 12/2011 | Weiss et al. | |
| 2011/0309325 A1* | 12/2011 | Park | H01L 25/0753 257/13 |
| 2012/0106197 A1 | 5/2012 | Lai et al. | |
| 2012/0113672 A1 | 5/2012 | Dubrow et al. | |
| 2012/0170282 A1 | 7/2012 | Lin et al. | |
| 2013/0128548 A1 | 5/2013 | Lin | |
| 2014/0049826 A1 | 2/2014 | Lee et al. | |

FOREIGN PATENT DOCUMENTS

| | | |
|---|---|---|
| CN | 1880839 A | 12/2006 |
| CN | 1881034 A | 12/2006 |
| EP | 2068193 A2 | 6/2009 |
| JP | 2004303441 A | 10/2004 |
| JP | 2004315661 A | 11/2004 |
| JP | 2007-005098 A | 1/2007 |
| JP | 2007173754 A | 7/2007 |
| JP | 2008-287073 A | 11/2008 |
| JP | 2009200534 A | 9/2009 |
| JP | 2010123918 A | 6/2010 |
| KR | 2100060056834 A | 5/2006 |
| KR | 20060125535 A | 12/2006 |
| KR | 20060129835 A | 12/2006 |
| KR | 20070092440 A | 9/2007 |
| KR | 1020080007247 A | 1/2008 |
| KR | 1020080063986 A | 7/2008 |
| KR | 1020090021912 A | 3/2009 |
| KR | 20100024420 A | 3/2010 |
| KR | 1020100027892 A | 3/2010 |
| KR | 20100047841 A | 5/2010 |
| KR | 1020100046698 A | 5/2010 |
| KR | 10-2010-0118557 A | 11/2010 |
| KR | 1020100129030 A | 12/2010 |
| KR | 10-2011-0012246 A | 2/2011 |
| KR | 1020120001387 A | 1/2012 |
| TW | 200702822 | 1/2007 |
| TW | 200736761 A | 10/2007 |
| TW | 200739192 | 10/2007 |
| TW | 200803600 A | 1/2008 |
| TW | 200848809 A | 12/2008 |
| TW | 201035484 A | 10/2010 |
| TW | 201041191 A | 11/2010 |
| TW | 201044067 A | 12/2010 |
| TW | 201105767 A | 2/2011 |
| TW | 201123549 A | 7/2011 |
| WO | WO-2012144720 A1 | 10/2012 |

OTHER PUBLICATIONS

European Search Report in European Application No. 12814403.7 dated Feb. 13, 2015.
Office Action dated Apr. 6, 2016 in Taiwanese Application No. 101126235.
International Search Report in International Application No. PCT/KR2012/004625, dated Dec. 24, 2012.
Notice of Allowance dated Apr. 12, 2013 in Korean Application No. 10-2011-0071135.
European Search Report in European Application No. 12814589.3, dated Apr. 16, 2015.
Office Action dated Jun. 25, 2014 in Taiwanese Application No. 10-1121880.
Final Office Action dated Jul. 30, 2015 in U.S. Appl. No. 14/233,440.
European Search Report dated Sep. 7, 2015 in European Application No. 15172626.2.
International Search Report in International Application No. PCT/KR2012/004611, filed Jun. 11, 2012.
Taiwanese Office Action dated Jan. 23, 2015 in Taiwanese Application No. 101125849.

(56) References Cited

OTHER PUBLICATIONS

European Search Report dated Feb. 12, 2015 in International Application No. PCT/KR2012/004611.
International Search Report in International Application No. PCT/KR2012/004521, filed Jun. 8, 2012.
Office Action dated Dec. 3, 2014 in Taiwanese Application No. 101121510.
Office Action dated Dec. 24, 2012 in Korean Application No. 10-2011-0069797.
Office Action dated Aug. 18, 2015 in U.S. Appl. No. 14/232,843.
International Search Report in International Application No. PCT/KR2011/009232, filed Nov. 30, 2011.
Office Action dated Jul. 31, 2012 in Korean Application No. 10-2011-0009833.
Office Action dated Mar. 13, 2015 in U.S. Appl. No. 13/982,916.
Office Action dated Mar. 16, 2016 in U.S. Appl. No. 13/982,916.
International Search Report in International Application No. PCT/KR2012/006308, filed Aug. 8, 2012.
Office Action dated Jan. 28, 2016 in Chinese Application No. 201280066300.9.
Office Action dated Aug. 30, 2016 in U.S. Appl. No. 14/234,123.
Office Action dated Jun. 19, 2015 in U.S. Appl. No. 14/234,123.
Office Action dated Dec. 14, 2016 in U.S. Appl. No. 14/234,123.
Office Action dated Nov. 25, 2016 in U.S. Appl. No. 14/747,577.
Office Action dated Dec. 29, 2016 in U.S. Appl. No. 15/136,239.
Office Action dated Jul. 5, 2016 in U.S. Appl. No. 14/356,657.
Office Action dated Jan. 5, 2017 in U.S. Appl. No. 14/356,657.
Office Action dated Mar. 21, 2017 in Taiwanese Application No. 105144121.

\* cited by examiner

OPTICAL MEMBER AND DISPLAY DEVICE HAVING THE SAME

CROSS-REFERENCE TO RELATED APPLICATIONS

This application is the U.S. national stage application of International Patent Application No. PCT/KR2012/005418, filed Jul. 9, 2012, which claims priority to Korean Application No. 10-2011-0071802, filed Jul. 20, 2011, the disclosures of each of which are incorporated herein by reference in their entirety.

TECHNICAL FIELD

The embodiment relates to an optical member and a display device having the same.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device, which is capable of displaying various images using the white light supplied to the light guide plate through the quantum dot bar as the blue light is emitted from the blue LED, has been extensively used.

A display device employing such a quantum dot is disclosed in Korean Unexamined Patent Publication No. 10-2011-006810.

DISCLOSURE OF INVENTION

Technical Problem

The embodiment provides an optical member having the superior optical characteristic and a display device having the same.

Solution to Problem

A display device according to the embodiment includes a light guide plate; a light source on a lateral side of the light guide plate; and a wavelength conversion member between the light source and the light guide plate, wherein the wavelength conversion member includes a receiving part between the light source and the light guide plate; a host in the receiving part; and a plurality of wavelength conversion particles in the host, and wherein the receiving part includes a convex part between the light source and the host; and a concave part between the light guide plate and the host.

An optical member according to the embodiment includes a receiving part; a host in the receiving part; and a plurality of wavelength conversion particles in the host, wherein the receiving part includes a convex part bulged toward the host; and a concave part that sandwiches the host together with the convex part.

Advantageous Effects of Invention

The optical member and the display device according to the embodiment include the convex part and the concave part. Thus, the light emitted from the light source can be incident substantially perpendicular to the host.

That is, the convex part faces the light source and the host may have a concave shape by the convex part. At this time, even if the light is radially emitted from the light source, the concave part of the host may be directed to the light source, so the light emitted from the light source can be incident substantially perpendicular to the host.

Therefore, the wavelength conversion particles can effectively convert the light emitted from the light source. Thus, the optical member and the display device according to the embodiment may represent the improved color reproduction.

MODE FOR THE INVENTION

In the description of the embodiments, it will be understood that when a substrate, a frame, a sheet, a layer or a pattern is referred to as being "on" or "under" another substrate, another frame, another sheet, another layer, or another pattern, it can be "directly" or "indirectly" on the other substrate, frame, sheet, layer, or pattern, or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 1:
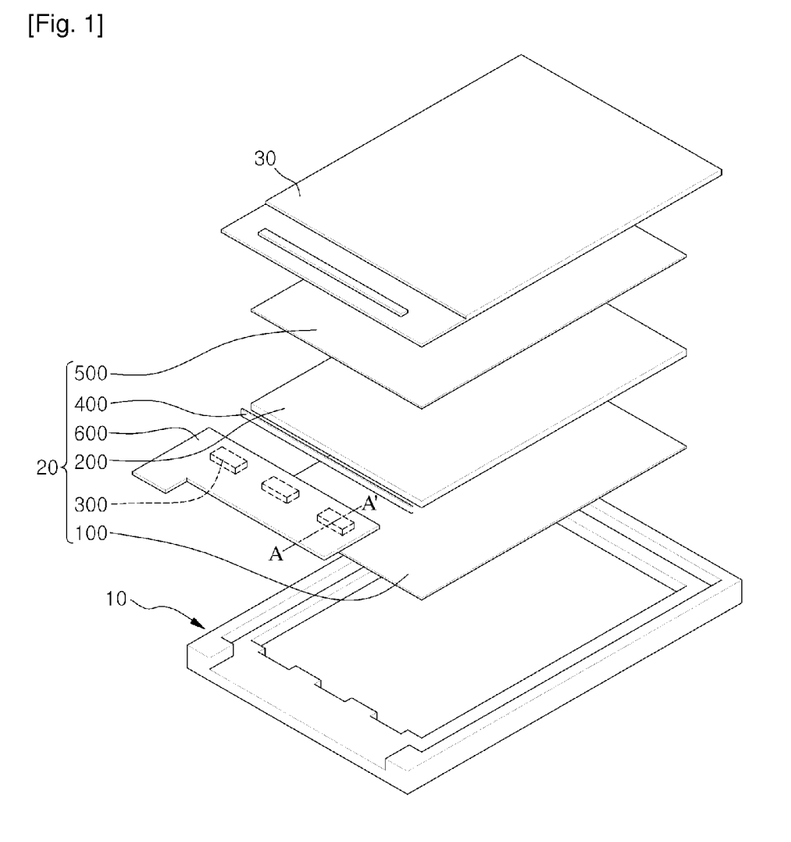
FIG. 1 is an exploded perspective view showing an LCD according to the embodiment.
Figure 2:
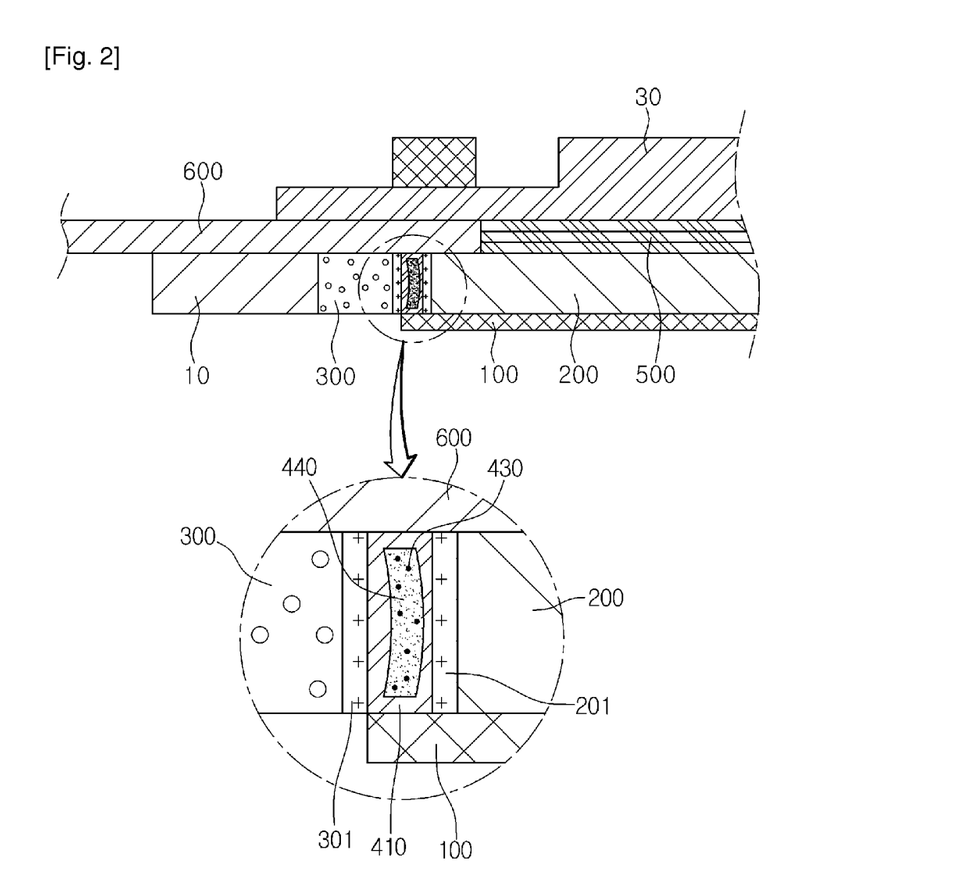
FIG. 2 is a sectional view taken along line A-A' of FIG. 1.
Figure 3:
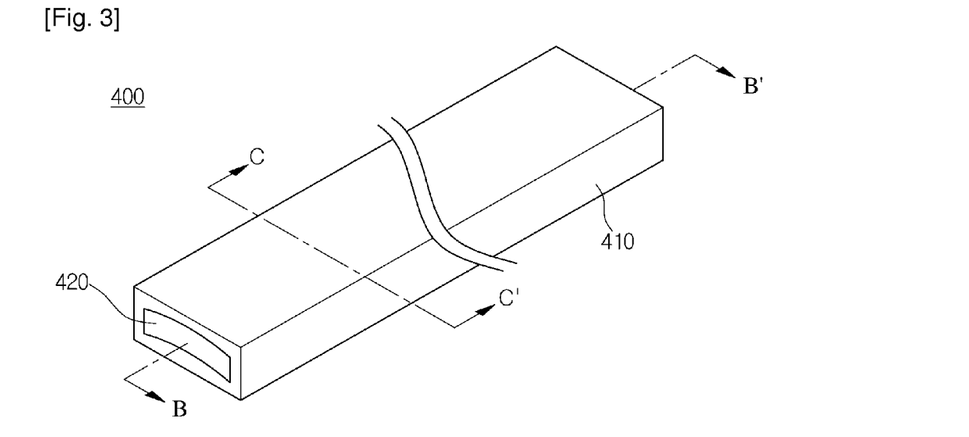
FIG. 3 is a perspective view of a wavelength conversion member according to the embodiment.
Figure 4:
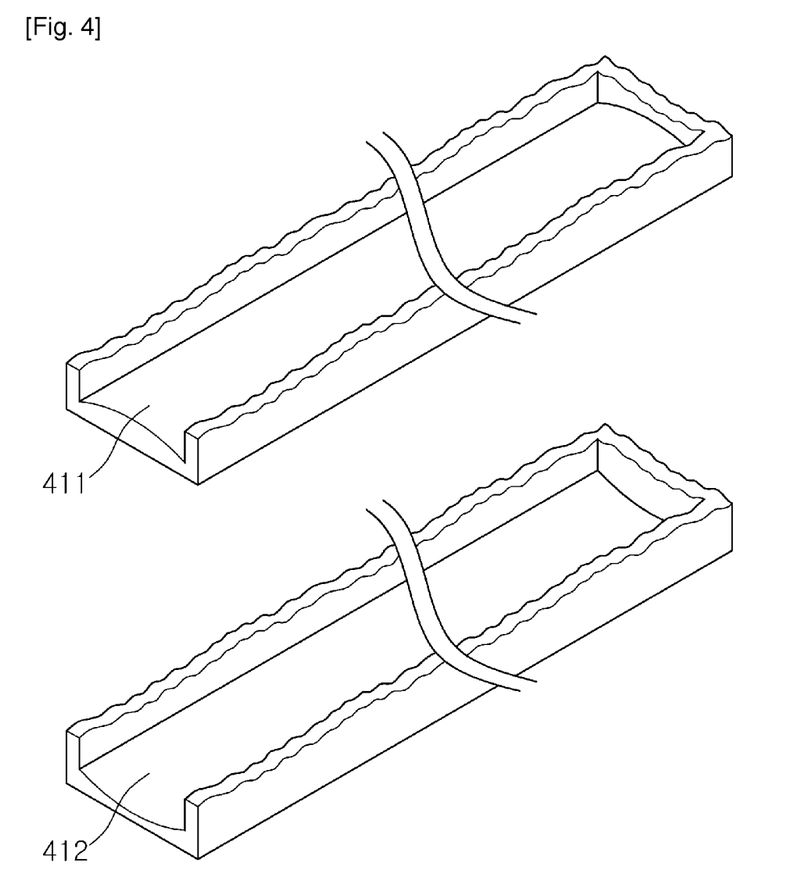
FIG. 4 is a perspective view showing a convex part and a concave part.
Figure 5:
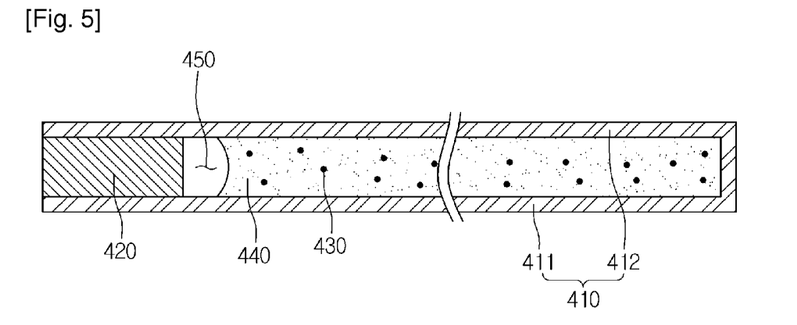
FIG. 5 is a sectional view taken along line B-B' of FIG. 3.
Figure 6:
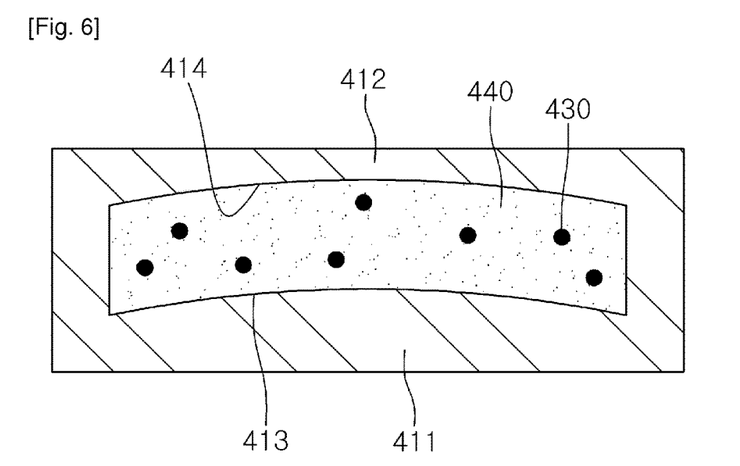
FIG. 6 is a sectional view taken along line C-C' of FIG. 3.
Figure 8:
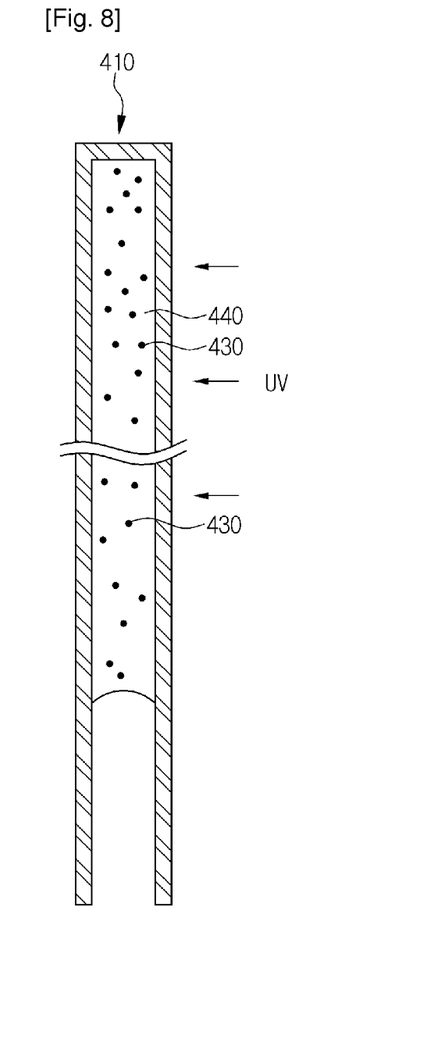
Figure 9:
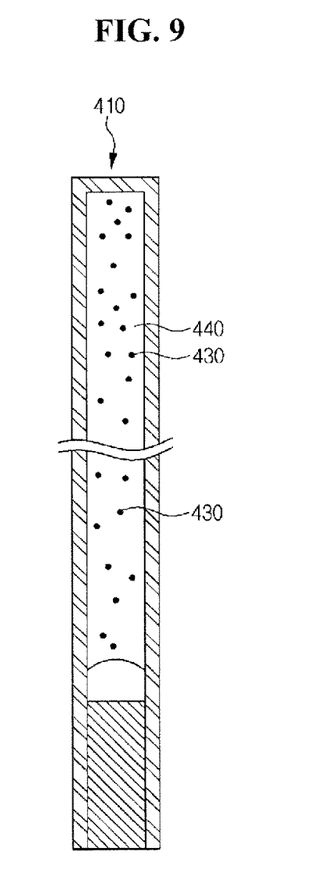
Figure 10:
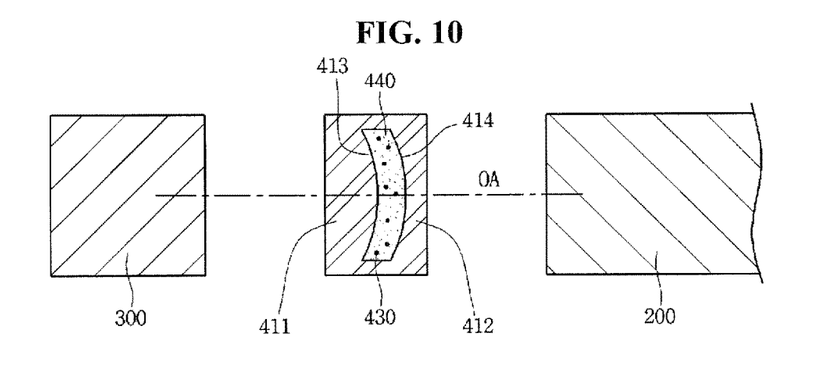
FIG. 10 is a view showing a light emitting diode, a wavelength conversion member and a light guide plate according to the embodiment.

FIG. 1 is an exploded perspective view showing an LCD according to the embodiment, FIG. 2 is a sectional view taken along line A-A' of FIG. 1, FIG. 3 is a perspective view of a wavelength conversion member according to the embodiment, FIG. 4 is a perspective view showing a convex part and a concave part, FIG. 5 is a sectional view taken along line B-B' of FIG. 3, FIG. 6 is a sectional view taken along line C-C' of FIG. 3, FIGS. 7 to 9 are views showing the procedure for manufacturing a wavelength conversion member according to the embodiment, and FIG. 10 is a view showing a light emitting diode, a wavelength conversion member and a light guide plate according to the embodiment.

Referring to FIGS. 1 to 10, the LCD according to the embodiment includes a mold frame 10, a backlight assembly 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, light emitting diodes 300, a wavelength conversion member 400, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100. The light guide plate 200 guides the light upward by reflecting, refracting and scattering the light incident thereto from the light emitting diodes 300.

The light guide plate 200 includes an incident surface facing the light emitting diodes 300. Among the lateral sides of the light guide plate 200, a lateral side facing the light emitting diodes 300 may serve as the incident surface.

The light emitting diodes 300 are disposed at the lateral side of the light guide plate 200. In detail, the light emitting diodes 300 are disposed at the incident surface of the light guide plate 200.

The light emitting diodes 300 may serve as light sources for generating the light. In detail, the light emitting diodes 300 may emit the light toward the wavelength conversion member 400.

The light emitting diodes 300 may be blue light emitting diodes that generate blue light or UV light emitting diodes that emit UV light. That is, the light emitting diodes 300 may generate the blue light having the wavelength band in the range of about 430 nm to about 470 nm, or the UV light having the wavelength band in the range of about 300 nm to about 400 nm.

The light emitting diodes 300 may be mounted on the FPCB 600. The light emitting diodes 300 may be disposed under the FPCB 600. The light emitting diodes 300 may be driven by receiving the driving signal through the FPCB 600.

The wavelength conversion member 400 is disposed between the light emitting diodes 300 and the light guide plate 200. The wavelength conversion member 400 is bonded to the lateral side of the light guide plate 200. In detail, the wavelength conversion member 400 is bonded to the incident surface of the light guide plate 200. In addition, the wavelength conversion member 400 can be bonded to the light emitting diodes 300.

The wavelength conversion member 400 receives the light emitted from the light emitting diodes 300 in order to convert the wavelength of the light. In detail, the wavelength conversion member 400 may convert the blue light emitted from the light emitting diodes 300 into the green light and the red light. That is, the wavelength conversion member 400 may convert a part of the blue light into the green light having the wavelength in the range of about 520 nm to about 560 nm and a part of the blue light into the red light having the wavelength in the range of about 630 nm to about 660 nm.

In addition, the wavelength conversion member 400 may convert the UV light emitted from the light emitting diodes 300 into the blue light, the green light and the red light. That is, the wavelength conversion member 400 may convert a part of the UV light into the blue light having the wavelength in the range of about 430 nm to about 470 nm, a part of the UV light into the green light having the wavelength in the range of about 520 nm to about 560 nm and a part of the UV light into the red light having the wavelength in the range of about 630 nm to about 660 nm.

Therefore, the white light may be generated by the light passing through the wavelength conversion member 400 and the lights converted by the wavelength conversion member 400. In detail, the white light can be incident into the light guide plate 200 through the combination of the blue light, the green light and the red right.

As shown in FIGS. 2 to 6 and 10, the wavelength conversion member 400 includes a tube 410, a sealing part 420, a plurality of wavelength conversion particles 430, and a host 440.

The tube 410 receives the sealing part 420, the wavelength conversion particles 430 and the host 440 therein. That is, the tube 410 may serve as a receptacle to receive the sealing part 420, the wavelength conversion particles 430 and the host 440. In addition, the tube 410 extends in one direction.

The tube 410 may have a rectangular pipe shape. In detail, a section of the tube 410, which is perpendicular to the length direction of the tube 410, may have the rectangular shape. The tube 410 may have a width of about 0.6 mm and a height of about 0.2 mm. The tube 410 may include a capillary tube.

The tube 410 includes a convex part 411 and a concave part 412.

The convex part 411 faces the light emitting diodes 300. The convex part 411 is adjacent to the light emitting diodes 300. The convex part 411 faces the concave part 412. The convex part 411 is convex toward the host 440.

The convex part 411 may include a curved surface 413. The curved surface 413 of the convex part 411 may directly make contact with the host 440. Thus, a shape of one surface of the host 440 may be determined by the convex part 411. That is, one surface of the host 440 may coincide with the curved surface 413 of the convex part 411.

The tube 410 extends in one direction. Thus, the wavelength conversion member 400 extends in one direction. In addition, the convex part 411 extends in the extension direction of the wavelength conversion member 400. At this time, a section of the convex part 411, which is perpendicular to the extension direction of the wavelength conversion member 400, may be constant.

The light emitted from the light emitting diodes 300 is incident into the host 440 through the convex part 411. That is, the convex part 411 may serve as an incident part to which the light is incident.

The concave part 412 faces the convex part 411. In addition, the concave part 412 is opposite to the incident surface of the light guide plate 200. The host 440 is sandwiched by the concave part 412 and the convex part 411. That is, the host 440 is interposed between the concave part 412 and the convex part 411.

The concave part 412 has a shape corresponding to a shape of the convex part 411. That is, the concave part 412 has a concave shape corresponding to a convex shape of the convex part 411. In detail, the concave part 412 is recessed toward the light guide plate 200 to the extent of the convex degree of the convex part 411.

The concave part 412 may include a curved surface 414. The curved surface 414 of the concave part 412 may directly make contact with the host 440. Thus, a shape of one surface of the host 440 may be determined by the concave part 412. That is, one surface of the host 440 may coincide with the curved surface 414 of the concave part 412.

The tube 410 extends in one direction. Thus, the wavelength conversion member 400 extends in one direction. In addition, the concave part 412 extends in the extension direction of the wavelength conversion member 400. At this time, a section of the concave part 412, which is perpendicular to the extension direction of the wavelength conversion member 400, may be constant.

The light emitted from the host 440 is incident into the light guide plate 200 through the concave part 412. That is, the concave part 412 may serve as an exit part through which the light is output.

The convex part 411 may be integrally formed with the concave part 412. Due to the convex part 411 and the concave part 412, a space for receiving the host 440 and the wavelength conversion particles 430 can be formed.

The tube 410 is transparent. The tube 410 may include glass. In detail, the tube 410 may include a glass capillary tube.

The sealing part 420 is disposed in the tube 410. The sealing part 420 is arranged at an end of the tube 410. The sealing part 420 is disposed at an inlet of the tube 410. The sealing part 420 seals the interior of the tube 410. The sealing part 420 may include epoxy resin.

The wavelength conversion particles 430 are provided in the tube 410. In detail, the wavelength conversion particles 430 are uniformly distributed in the host 440 installed in the tube 410.

The wavelength conversion particles 430 convert the wavelength of the light emitted from the light emitting diodes 300. In detail, the light is incident into the wavelength conversion particles 430 from the light emitting diodes 300 and the wavelength conversion particles 430 convert the wavelength of the incident light. For instance, the wavelength conversion particles 430 can convert the blue light emitted from the light emitting diodes 300 into the green light and the red light. That is, a part of the wavelength conversion particles 430 converts the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent. The quantum dots can be synthesized through the chemical wet scheme.

The host 440 surrounds the wavelength conversion particles 430. In detail, the wavelength conversion particles 430 are uniformly distributed in the host 440. The host 440 includes polymer. The host 440 is transparent. That is, the host 440 includes transparent polymer.

The host 440 is disposed in the tube 410. In detail, the host 440 is fully filled in the tube 410. The host 440 may adhere to an inner surface of the tube 410.

The host 440 may be curved by the convex part 411 and the concave part 412. In detail, the distance between the host 440 and the light emitting diodes 300 is longest when the distance is measured at a point where the host 440 meets the optical axis OA of the light emitting diode 300. That is, on the basis of the drawings, the distance between the host 440 and the light emitting diodes 300 is shortest when the distance is measured at upper and lower portions of the host 400.

The light is radially emitted from the light emitting diode 300 about the optical axis of the light emitting diode 300. Thus, the light emitted from the light emitting diode 300 can be incident into the host 440 more perpendicularly to the host 440. In addition, since the upper and lower peripheral portions of the host 400 are closed to the light emitting diode 300, the amount of light, which is leaked without passing through the host 440, can be reduced. Therefore, the light emitted from the light emitting diode 300 can be effectively incident into the host 440 and the wavelength conversion particles 430. That is, the LCD according to the embodiment may represent the improved color reproduction.

An air layer 450 is formed between the sealing part 420 and the host 440. The air layer 450 is filled with nitrogen. The air layer 450 performs the damping function between the sealing part 420 and the host 440.

Referring to FIG. 2, the wavelength conversion member 400 is bonded to the light guide plate 200. A first bonding layer 201 is interposed between the wavelength conversion member 400 and the light guide plate 200, and the wavelength conversion member 400 is bonded to the lateral side of the light guide plate 200 by the first bonding layer 201.

The wavelength conversion member 400 adheres to the first bonding layer 201. In detail, the tube 410 adheres to the first bonding layer 201. In more detail, the curved surface 413 of the tube 410 adheres to the first bonding layer 201. The first bonding layer 201 may adhere to the entire area of the curved surface 413 of the tube 410.

Therefore, the first bonding layer 201 includes a curved surface corresponding to the curved surface 413 of the tube 410. That is, the first bonding layer 201 has the curved surface having the shape corresponding to the shape of the curved surface 411 of the tube 410.

The first bonding layer 201 has the refractive index higher than that of the tube 410. For instance, the tube 410 has the refractive index of about 1.2 to about 1.4 and the first bonding layer 201 has the refractive index of about 1.3 to about 1.7.

The first bonding layer 201 is transparent. The first bonding layer 201 may include epoxy resin or acryl resin.

The wavelength conversion member 400 is bonded to the light emitting diode 300. A second bonding layer 301 is interposed between the wavelength conversion member 400 and the light emitting diode 300. The wavelength conversion member 400 is bonded to the exit surface of the light emitting diode 300 by the second bonding layer 301.

The wavelength conversion member 400 adheres to the second bonding layer 301. In detail, the tube 410 adheres to the second bonding layer 301. The second bonding layer 301 is transparent. The second bonding layer 301 may include epoxy resin or acryl resin.

Figure 7:
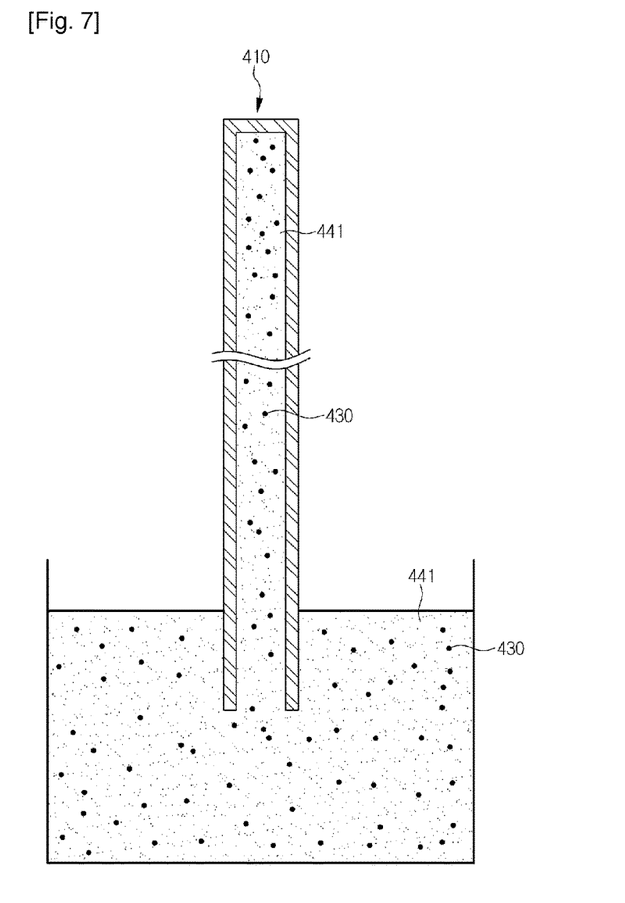
FIGS. 7 to 9 are views showing the procedure for manufacturing a wavelength conversion member according to the embodiment.

FIGS. 7 to 9 are views showing the procedure for manufacturing the wavelength conversion member 400 according to the embodiment. The wavelength conversion member 400 can be prepared through the following method.

Referring to FIG. 7, the wavelength conversion particles 430 are uniformly distributed in a resin composition. The resin composition is transparent. The resin composition may have photo-curable property.

Then, internal pressure of the tube 410 is reduced, an inlet of the tube 410 is immersed in the resin composition in which the wavelength conversion particles 430 are distributed, and ambient pressure is increased. Thus, the resin composition having the wavelength conversion particles 430 is introduced into the tube 410.

Referring to FIG. 8, a part of the resin composition introduced into the tube 410 is removed and the inlet of the tube 410 becomes empty. After that, the resin composition 441 introduced into the tube 410 is cured by UV light so that the host 440 can be formed.

Referring to FIG. 9, epoxy resin composition is introduced into the inlet of the tube 410. The introduced epoxy resin composition is cured so that the sealing part 420 is formed. The process for forming the sealing part 420 is performed under the nitrogen atmosphere, so the air layer 450 including nitrogen is formed between the sealing part 420 and the host 440.

The optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The mold frame 10 and the backlight assembly 20 constitute the backlight unit. That is, the backlight unit includes the mold frame 10 and the backlight assembly 20.

The liquid crystal panel 30 is installed in the mold frame 10 and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As described above, the display device according to the embodiment includes the convex part 411 and the concave part 412. Thus, the light emitted from the light emitting diodes 300 can be incident into the host 440 substantially perpendicular to the host 440.

That is, the convex part 411 faces the light emitting diodes 300 and the host 440 may have the concave shape due to the convex part 411. At this time, even if the light is radially emitted from the light emitting diodes 300, the concave part of the host 440 may be directed to the light emitting diodes 300, so the light emitted from the light emitting diodes 300 can be incident to the host 440 substantially perpendicular to the host 440.

Therefore, the wavelength conversion particles 430 can effectively convert the light emitted from the light emitting diodes 300. Thus, the display device according to the embodiment may represent the improved color reproduction.

Figure 11:
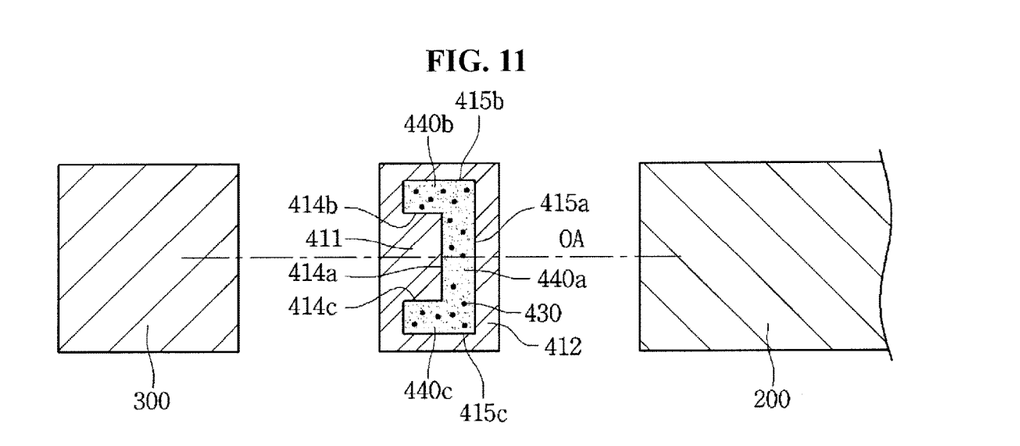
FIG. 11 is a view showing a light emitting diode, a wavelength conversion member and a light guide plate according to another embodiment.
Figure 12:
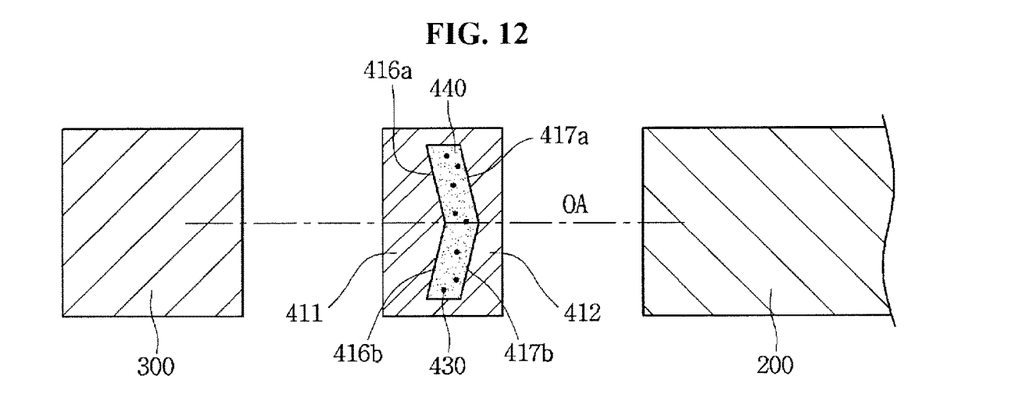
FIG. 12 is a view showing a light emitting diode, a wavelength conversion member and a light guide plate according to still another embodiment.

FIG. 11 is a view showing a light emitting diode, a wavelength conversion member and a light guide plate according to another embodiment, and FIG. 12 is a view showing a light emitting diode, a wavelength conversion member and a light guide plate according to still another embodiment. The following description will be made with reference to the description about the liquid crystal device. In addition, the description about the previous embodiment will be basically incorporated herein by reference except for modified parts.

Referring to FIG. 11, the convex part 411 may have a polygonal shape. In detail, the convex part 411 may have a first plane 414a, a second plane 414b, and a third plane 414c.

The first plane 414a faces the incident surface of the light guide plate 200. The first plane 414a may be perpendicular to the optical axis OA of the light emitting diode 300. In addition, the first plane 414a is parallel to the incident surface of the light guide plate 200.

The second plane 414b extends from the first plane 414a toward the light emitting diode 300. The second plane 414b may be parallel to the optical axis OA of the light emitting diode 300.

The third plane 414c extends from the first plane 414a toward the light emitting diode 300. The third plane 414c may be parallel to the optical axis OA of the light emitting diode 300. In addition, the second plane 414b may face the third plane 414c.

The concave part 412 may have a fourth plane 415a, a fifth plane 415b, and a sixth plane 415c.

The fourth plane 415a faces the first plane 414a. The fourth plane 415a is spaced apart from the first plane 414a, so a space is formed therebetween. The fourth plane 415a may be parallel to the first plane 414a.

The fifth plane 415b faces the second plane 414b. The fifth plane 415b extends from the fourth plane 415a toward the light emitting diode 300. The fifth plane 415b may be parallel to the optical axis OA of the light emitting diode 300. The fifth plane 415b is spaced apart from the second plane 414b, so a space is formed therebetween. The fifth plane 415b may be parallel to the second plane 414b.

The sixth plane 415c faces the third plane 414c. The sixth plane 415c extends from the fourth plane 415a toward the light emitting diode 300. The sixth plane 415c may be parallel to the optical axis OA of the light emitting diode 300. The sixth plane 415c is spaced apart from the third plane 414c, so a space is formed therebetween. The sixth plane 415c may be parallel to the third plane 414c.

The host 440 is disposed between the convex part 411 and the concave part 412. In addition, the host 440 may directly make contact with the convex part 411 and the concave part 412. Further, the host 440 may be interposed between the first and fourth planes 414a and 415a, between the second and fifth planes 414b and 415b, and between the third and sixth planes 414c and 415c.

Thus, the host 440 may include a body 440a, a first extension part 440b and a second extension part 440c.

The body 440a faces the light guide plate 200. In detail, the body 440a faces the incident surface of the light guide plate 200. The body 440a may be parallel to the incident surface of the light guide plate 200. That is, the body 440a may be perpendicular to the optical axis OA of the light emitting diode 300. The body 440a is interposed between the first and fourth planes 414a and 415a.

The first extension part 440b extends from the body 440a. In detail, the first extension part 440b extends from an outer peripheral portion of the body 440a toward the light emitting diode 300. The first extension part 440b is interposed between the second and fifth planes 414b and 415b.

The second extension part 440c extends from the body 440a. In detail, the second extension part 440c extends from the outer peripheral portion of the body 440a toward the light emitting diode 300. The second extension part 440c is interposed between the third and sixth planes 414c and 415c.

Referring to FIG. 12, the convex part 411 includes a first inclined surface 416a and a second inclined surface 416b.

The first inclined surface 416a is inclined with respect to the optical axis OA of the light emitting diode 300. In addition, the second inclined surface 416b is inclined with respect to the optical axis OA of the light emitting diode 300. The first and second inclined surfaces 416a and 416b may meet with each other.

Thus, the convex part 411 may have a mountain shape. That is, the convex part 411 may have a triangular prism shape.

The concave part 412 includes a third inclined surface 417a and a fourth inclined surface 417b. The third inclined surface 417a is inclined with respect to the optical axis OA of the light emitting diode 300. In addition, the fourth inclined surface 417b is inclined with respect to the optical axis OA of the light emitting diode 300. The third and fourth inclined surfaces 417a and 417b may meet with each other.

The first inclined surface 416a faces the third inclined surface 417a. In addition, the first inclined surface 416a may be parallel to the third inclined surface 417a. The first inclined surface 416a is spaced apart from the third inclined surface 417a, so a space is formed therebetween.

The second inclined surface 416b faces the fourth inclined surface 417b. In addition, the second inclined surface 416b may be parallel to the fourth inclined surface 417b. The second inclined surface 416b is spaced apart from the fourth inclined surface 417b, so a space is formed therebetween.

The host 440 is disposed between the first and third inclined surfaces 416a and 417a and between the second and fourth inclined surfaces 416b and 417b. Thus, the host 440 may have a sectional shape of 'V'.

According to the LCD of the embodiments, the length of the first and second extension parts 440b and 440c can be adjusted or the bending angle of the host 440 can be adjusted. Therefore, the LCD according to the embodiment can reduce the light leaked out of the host 440 and can improve the color reproduction.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A wavelength conversion member comprising:
   a tube;
   a host in the tube;
   an air layer in the tube; and
   a plurality of quantum dots (QDs) in the host,
   wherein the tube includes two pairs of opposite inner surfaces surrounding the host;
   wherein the two pairs of opposite inner surfaces include a first inner surface, a second inner surface facing the first inner surface, a third inner surface, and a fourth inner surface facing the third inner surface;
   wherein the host includes two pairs of opposite outer surfaces;
   wherein the two pairs of opposite outer surfaces include a first outer surface, a second outer surface facing the first outer surface, a third outer surface, and a fourth outer surface facing the third outer surface;
   wherein each of the first inner surface and the second inner surface includes a curved surface,
   wherein each of the third inner surface and the fourth inner surface includes a planar surface,
   wherein the first outer surface includes a curved surface corresponding to that of the first inner surface,
   wherein the second outer surface includes a curved surface corresponding to that of the second inner surface,
   wherein the third outer surface includes a planar surface corresponding to that of the third inner surface, and
   wherein the fourth outer surface includes a planar surface corresponding to that of the fourth inner surface.

2. The wavelength conversion member of claim 1, wherein the tube comprises glass.

3. The wavelength conversion member of claim 1, wherein the air layer includes nitrogen.

4. The wavelength conversion member of claim 1, wherein the tube further comprises:
   a first distal end;
   a second distal end opposite to the first distal end;
   a first tube portion;
   a second tube portion adjacent to the first tube portion; and
   a midpoint between the distal end and the second distal end along a first direction that is parallel to a central longitudinal axis of the tube,
   wherein the first tube portion extends from the first distal end to the midpoint and comprises the air layer and a portion of the host,
   wherein the second tube portion extends from the midpoint to the second distal end and comprises a portion of the host, and
   wherein a length of the portion of the host of the first tube portion, taken in the first direction, is less than a length of the portion of the host of the second tube portion, taken in the first direction.

5. The wavelength conversion member of claim 1, wherein the tube further comprises
   a first distal end;
   a second distal end opposite to the first distal end;
   a first tube portion;
   a second tube portion adjacent to the first tube portion; and
   a midpoint between the distal end and the second distal end along a first direction that is parallel to a central longitudinal axis of the tube,
   wherein the first tube portion extends from the first distal end to the midpoint and comprises the air layer and a portion of the host,
   wherein the second tube portion extends from the midpoint to the second distal end and comprises a portion of the host, and
   wherein the mass of the portion of the host of the first tube portion is smaller than the mass of the portion of the host of the second tube portion.

6. The wavelength conversion member of claim 4, wherein the first tube portion further comprises a first sealing portion and the second tube portion further comprises a second sealing portion.

7. The wavelength conversion member of claim 6, wherein a length of the second sealing portion, taken in the first direction, is smaller than that of the first sealing portion, taken in the first direction.

8. The wavelength conversion member of claim 6, wherein the first sealing portion seals the first tube portion and comprises a material different from the tube.

9. The wavelength conversion member of claim 6, wherein the air layer is in direct contact with the host in the first tube portion.

10. The wavelength conversion member of claim 9, wherein at least a portion of a surface of the host in contact with the air layer is curved.

11. A backlight assembly comprising:
    a reflective sheet;
    a light guide plate on the reflective sheet;
    an optical sheet on the light guide plate;
    a light source disposed at an incident surface of the light guide plate; and a wavelength conversion member disposed between the light source and the light guide plate,
wherein the wavelength conversion member comprises:
a tube;
a host in the tube;
an air layer in the tube; and
a plurality of quantum dots (QDs) in the host,
wherein the tube includes two pairs of opposite inner surfaces surrounding the host;
wherein the two pairs of opposite inner surfaces include a first inner surface, a second inner surface facing the first inner surface, a third inner surface, and a fourth inner surface facing the third inner surface;
wherein the host includes two pairs of opposite outer surfaces;
wherein the two pairs of opposite outer surfaces include a first outer surface, a second outer surface facing the first outer surface, a third outer surface, and a fourth outer surface facing the third outer surface;
wherein each of the first inner surface and the second inner surface includes a curved surface,
wherein each of the third inner surface and the fourth inner surface includes a planar surface,
wherein the first outer surface includes a curved surface corresponding to that of the first inner surface,
wherein the second outer surface includes a curved surface corresponding to that of the second inner surface,
wherein the third outer surface includes a planar surface corresponding to that of the third inner surface,
wherein the fourth outer surface includes a planar surface corresponding to that of the fourth inner surface,
wherein the tube extends along the incident surface of the light guide plate, and
wherein the light source includes a plurality of blue LEDs disposed along the incident surface of the light guide plate.

12. The backlight assembly of claim 11, wherein at least one of the first inner surface and the second inner surface includes a concave shape.

13. The backlight assembly of claim 11, wherein at least one of the first outer surface and the second outer surface includes a concave shape.

14. The backlight assembly of claim 11, wherein the tube further comprises
a first distal end;
a second distal end opposite to the first distal end;
a first tube portion;
a second tube portion adjacent to the first tube portion; and
a midpoint between the distal end and the second distal end along a first direction that is parallel to a central longitudinal axis of the tube,
wherein the first tube portion extends from the first distal end to the midpoint and comprises the air layer and a portion of the host,
wherein the second tube portion extends from the midpoint to the second distal end and comprises a portion of the host, and
wherein a length of the portion of the host of the first tube portion, taken in the first direction, is less than a length of the portion of the host of the second tube portion, taken in the first direction.

15. The backlight assembly of claim 11, wherein the tube further comprises
a first distal end;
a second distal end opposite to the first distal end;
a first tube portion;
a second tube portion adjacent to the first tube portion; and
a midpoint between the distal end and the second distal end along a first direction that is parallel to a central longitudinal axis of the tube,
wherein the first tube portion extends from the first distal end to the midpoint and comprises the air layer and a portion of the host,
wherein the second tube portion extends from the midpoint to the second distal end and comprises a portion of the host, and
wherein the mass of the portion of the host of the first tube portion is smaller than the mass of the portion of the host of the second tube portion.

16. The backlight assembly of claim 11, wherein the tube comprises glass.

17. The backlight assembly of claim 11, wherein the air layer includes nitrogen.

18. A display device comprising:
a frame;
a backlight assembly on the frame;
a reflective sheet;
a light guide plate on the reflective sheet;
an optical sheet on the light guide plate;
a light source disposed at an incident surface of the light guide plate; and
a wavelength conversion member disposed between the light source and the light guide plate,
wherein the wavelength conversion member comprises:
a tube between the light source and the light guide plate;
a host in the tube;
an air layer in the tube; and
a plurality of wavelength conversion particles in the host,
wherein the wavelength conversion particles comprise quantum dots;
wherein the tube includes two pairs of opposite inner surfaces surrounding the host;
wherein the two pairs of opposite inner surfaces include a first inner surface, a second inner surface facing the first inner surface, a third inner surface, and a fourth inner surface facing the third inner surface;
wherein the host includes two pairs of opposite outer surfaces;
wherein the two pairs of opposite outer surfaces include a first outer surface, a second outer surface facing the first outer surface, a third outer surface, and a fourth outer surface facing the third outer surface;
wherein each of the first inner surface and the second inner surface includes a curved surface,
wherein each of the third inner surface and the fourth inner surface includes a planar surface,
wherein the first outer surface includes a curved surface corresponding to that of the first inner surface,
wherein the second outer surface includes a curved surface corresponding to that of the second inner surface,
wherein the third outer surface includes a planar surface corresponding to that of the third inner surface,
wherein the fourth outer surface includes a planar surface corresponding to that of the fourth inner surface,
wherein the tube extends along the incident surface of the light guide plate, and
wherein the light source includes a plurality of blue LEDs disposed along the incident surface of the light guide plate.

19. The display device of claim 18, wherein at least one of the first inner surface and the second inner surface includes a concave shape.

20. The display device of claim 18, wherein at least one of the first outer surface and the second outer surface includes a concave shape.

21. The display device of claim 18, wherein the tube comprises glass.

22. The display device of claim 18, wherein the air layer includes nitrogen.

23. The display device of claim 18, wherein the tube further comprises
- a first distal end;
- a second distal end opposite to the first distal end;
- a first tube portion;
- a second tube portion adjacent to the first tube portion; and
- a midpoint between the distal end and the second distal end along a first direction that is parallel to a central longitudinal axis of the tube, wherein the first tube portion extends from the first distal end to the midpoint and comprises the air layer and a portion of the host, wherein the second tube portion extends from the midpoint to the second distal end and comprises a portion of the host, and wherein a length of the portion of the host of the first tube portion, taken in the first direction, is less than a length of the portion of the host of the second tube portion, taken in the first direction.

24. The display device of claim 18, wherein the tube further comprises
- a first distal end;
- a second distal end opposite to the first distal end;
- a first tube portion;
- a second tube portion adjacent to the first tube portion; and
- a midpoint between the distal end and the second distal end along a first direction that is parallel to a central longitudinal axis of the tube, wherein the first tube portion extends from the first distal end to the midpoint and comprises the air layer and a portion of the host, wherein the second tube portion extends from the midpoint to the second distal end and comprises a portion of the host, and wherein the mass of the portion of the host of the first tube portion is smaller than the mass of the portion of the host of the second tube portion.

25. The display device of claim 23, wherein the first tube portion further comprises a first sealing portion and the second tube portion further comprises a second sealing portion.

26. The display device of claim 25, wherein a length of the second sealing portion, taken in the first direction, is smaller than that of the first scaling portion, taken in the first direction.

27. The display device of claim 25, wherein the first sealing portion seals the first tube portion and comprises a material different from the tube.

28. The display device of claim 25, wherein the air layer is in direct contact with the host in the first tube portion.

29. The display device of claim 28, wherein at least a portion of a surface of the host in contact with the air layer is curved.

* * * * *